United States Patent [19]

Miller

[11] Patent Number: 4,936,248
[45] Date of Patent: Jun. 26, 1990

[54] BREADER FOR COATING EDIBLE FOOD PRODUCTS WITH FRESH BREAD CRUMBS

[75] Inventor: Michael E. Miller, Bellevue, Ohio

[73] Assignee: Stein, Inc., Sandusky, Ohio

[21] Appl. No.: 297,955

[22] Filed: Jan. 17, 1989

[51] Int. Cl.$^5$ .............................................. B05C 5/02
[52] U.S. Cl. ....................................... 118/24; 118/312
[58] Field of Search ............... 118/24, 30, 312, 19; 427/195

[56] References Cited

U.S. PATENT DOCUMENTS

| | | | |
|---|---|---|---|
| 3,045,640 | 7/1962 | Hill et al. | 118/24 X |
| 3,404,659 | 10/1968 | Croston | 118/24 |
| 3,547,075 | 12/1970 | Johnson | 118/16 |
| 3,759,218 | 9/1973 | Korstvedt | 118/312 X |
| 3,885,519 | 5/1975 | Orlowski | 118/24 X |
| 4,058,083 | 11/1977 | Miller | 118/24 X |
| 4,128,160 | 12/1978 | Deal et al. | 198/657 |
| 4,333,415 | 6/1982 | Miller et al. | 118/24 X |
| 4,676,361 | 6/1987 | Heisler | 198/817 X |

*Primary Examiner*—Richard L. Chiesa
*Attorney, Agent, or Firm*—Baldwin,Egan & Fetzer

[57] ABSTRACT

A breading machine incorporating the present invention for use with fresh or green bread crumbs for continuously coating a battered food product having a frame supporting an endless conveyor on which food product is disposed defining a food product conveyance path, and a rotatable drum type conveyor disposed adjacent to the path and operable to receive fresh bread crumbs and to convey the bread crumbs into a hopper for distribution to the food product conveyor for coating the food product carried thereon.

10 Claims, 3 Drawing Sheets

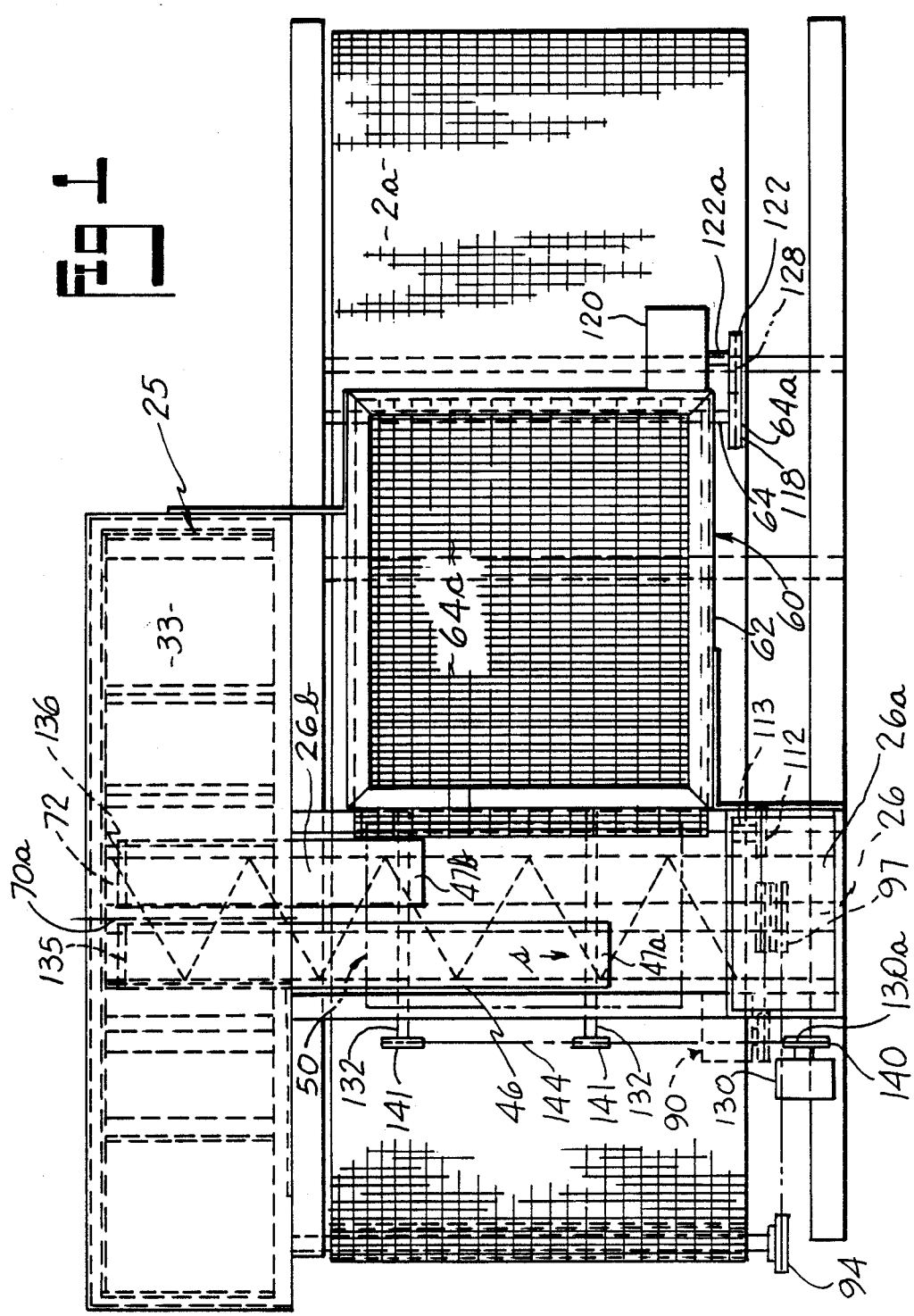

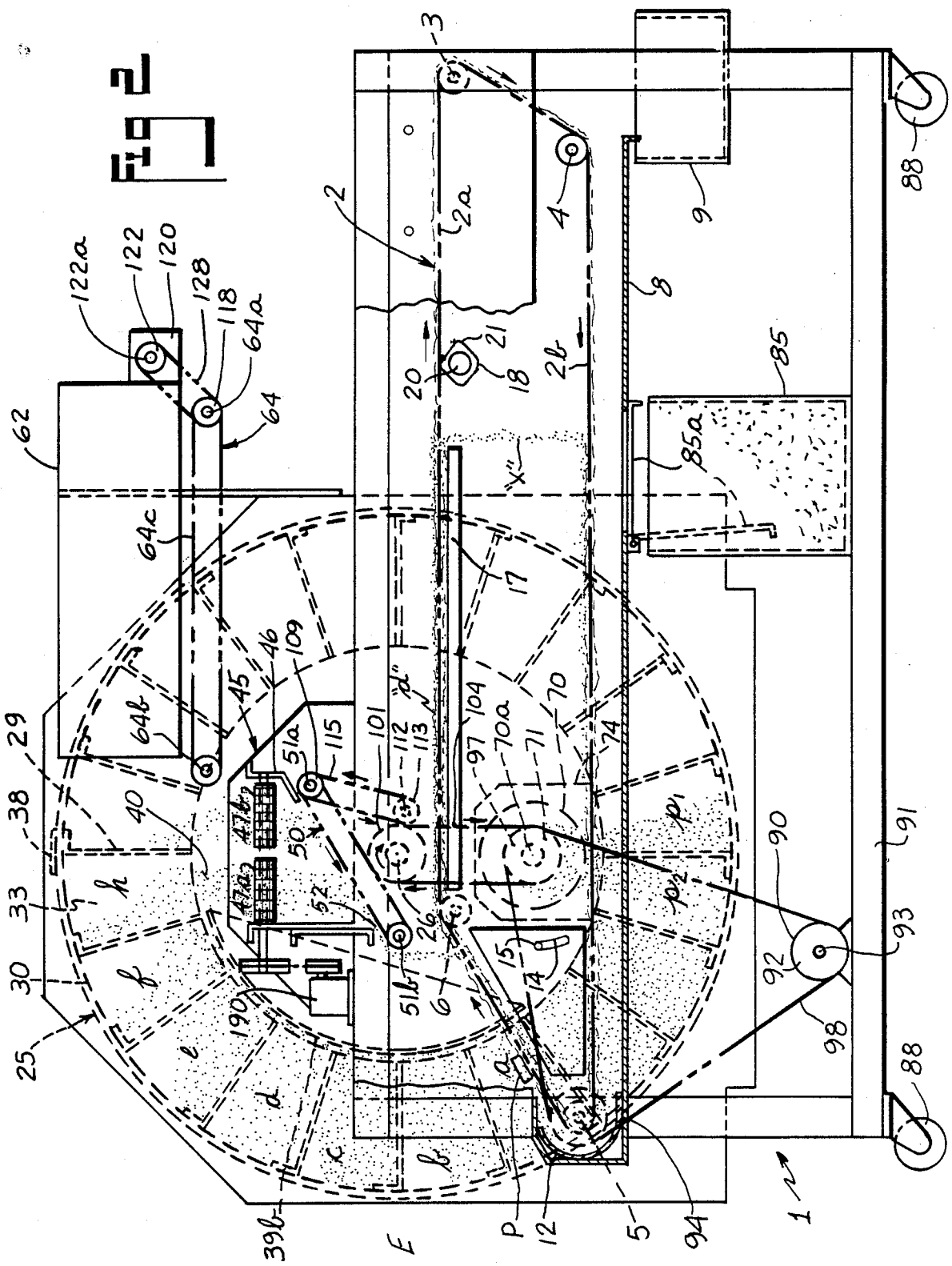

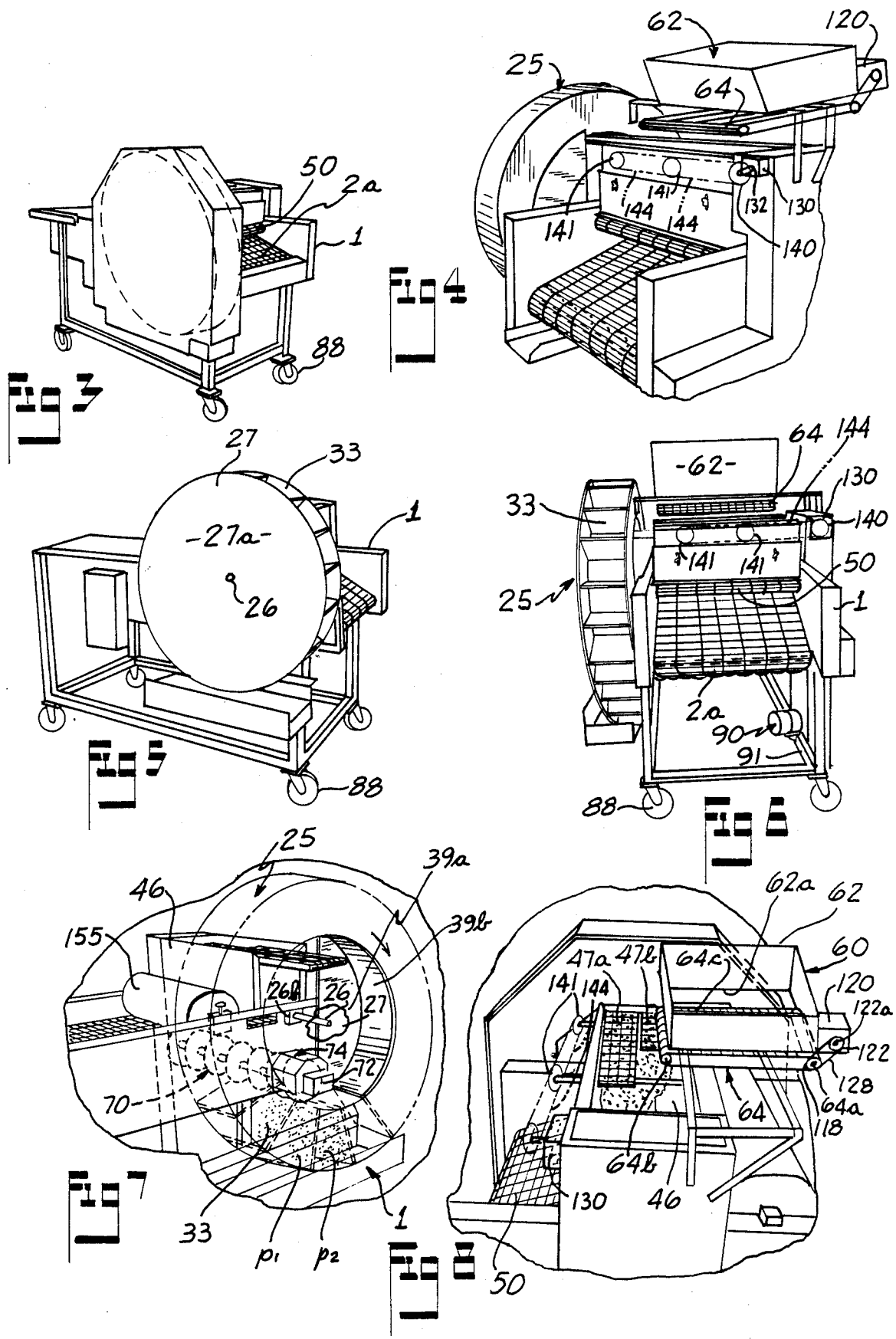

BREADER FOR COATING EDIBLE FOOD PRODUCTS WITH FRESH BREAD CRUMBS

In the field of large scale food preparation, a very large volume of food pieces are coated with batter and bread crumbs so that they may be cooked by deep fat frying. The food pieces are usually seafoods, poultry, red meats or vegetables. Common batters are made from corn and/or wheat flours, starches, seasonings, and gums plus water, mixed in various proportions as desired by the food processor. Bread crumbs may take many forms, but are usually a dry formulation of grain, flours, seasonings and spices. Common bread crumbs may be used in granular form, wherein granules are one-six-teenth of an inch or less in major dimension, or in flour form. Granular bread crumbs are usually termed "free flowing", because they will not pack into clumps, nor will they self-bridge over an opening slightly larger than the granules. Machines for applying such bread crumbs have been used for about three decades.

Recently, it has become desirable to use what is referred to in the art as "fresh bread" crumbs which, as the term signifies, are crumbs made from "fresh bread". In contrast to the "dry formulation" of common bread crumbs heretofore in use as referred to above, "fresh bread" crumbs usually have a substantial moisture content, thus requiring that the bread crumb coating apparatus be more gentle in its distribution and application of said crumbs to the food product to be coated. If the bread crumb apparatus operates too harshly upon the fresh bread crumbs they have a tendency to ball together to form dough balls which are undesirable as a crumb coating for food products.

The particle size of fresh bread crumbs is generally larger and somewhat pliable as compared to typical dry bread crumbs, and for this reason also the breading apparatus must be gentle in its distribution and coating so as to prevent the crumbs from being ground into smaller particle size.

FIELD OF THE INVENTION

Applying diverse edible fresh bread crumbs to surface coat a solid core of food, which has been first coated with a liquid batter.

STATE OF THE ART

In the assignee's U.S. Pat. No. 3,404,659 there is shown a drum type machine for coating articles such as donuts and the like with finely divided particles such as common powdered sugar. In this type of coating machine, a drum type conveyor carries the finely divided coating particles (powdered sugar) from an input circularly about the drum axis to several outlet hoppers for distribution and coating of the food products passing then below.

As will be fully understood in this drumtype conveyor the relative movement between the several components of the conveyor along with its associated distribution and coating apparatus results in a grinding action which tends to grind the coating material into still finer particle size.

Still another form of prior art breading machine is shown in assignee's U.S. Pat. Nos. 3,547,075 and 4,128,160, and is the type of breading machine to which the present invention relates.

In this type of breading machine a bottom layer of breading is first formed on a moving product conveyor belt onto which larger battered product pieces to be breaded are placed. The moving belt then carries the product under a falling curtain of bread crumbs which covers the top and sides of the product pieces. The moving belt may then pass under a pressure device, which may be a roller or series of rollers, which gently press the top layer of bread crumbs onto the product, the pressure also pressing the product onto and into the bottom layer of bread crumbs. Excess bread crumbs are then removed, generally with vibrators and/or air curtains, and the coated or breaded product is discharged from the breading machine.

However, this prior art breading machine typically incorporates bread crumb hopper and distribution apparatus to present and distribute the bread crumb to the moving belt and to the product, which does not satisfactorily or adequately process "fresh bread" type crumbs.

The present invention is directed particularly to a breading machine which utilizes bread crumb distribution apparatus that is especially designed to present and distribute "fresh bread" crumbs or breading to completely cover battered food products in such a gentle manner as to avoid any appreciable deterioration to said crumbs or breading.

SUMMARY OF THE INVENTION

A breading machine for use with "fresh bread" type crumbs to completely and continuously coat a battered food product carried on a moving conveyor belt.

Therefore a primary object of the present invention is to provide a breading machine especially designed to continuously coat battered food product with "fresh bread" type crumbs or breading and which machine includes bread crumb distribution apparatus that is operable to more gently process "fresh bread" crumbs or breading than heretofore possible.

Additional objects and advantages of the breading machine of the present invention will become apparent to one skilled in the art and upon reference to the following disclosure of a preferred embodiment wherein:

BRIEF DESCRIPTION OF THE DRAWINGS

FIG. 1 is a top plan view of a breading machine incorporating the present invention;

FIG. 2 is a side view of the breading machine of FIG. 1, with the outer cover of the drum type conveyor removed to illustrate the internal construction thereof;

FIG. 3 is an isometric view of the breading machine and showing the drum type conveyor located at one side of the breading machine;

FIG. 4 is a partial isometric view looking in the direction of the arrows 4—4 in FIG. 3;

FIG. 5 is an isometric view somewhat similar to FIG. 3 but with the outer cover of the drum conveyor removed;

FIG. 6 is an isometric view looking generally toward the input end of the breading machine in the direction of the arrows 6—6 in FIG. 3;

FIG. 7 is a partial isometric view showing the cross-feed screw or auger disposed under the moving product belt and extending at its outlet end into the drum conveyor; and, FIG. 8 is a partial isometric view looking generally in the direction of the arrows 8—8 in FIG. 5, and showing the endless conveyor belts for distributing the fresh bread crumbs or breading from the drum conveyor onto an underlying transfer endless conveyor belt for coating the top and sides of the battered food product passing then below.

SPECIFICATION

Referring now to FIGS. 1 and 2, the breading machine of the present invention incorporates a typical prior art endless pervious product conveyor belt 2 supported in frame 1 on a plurality of suitable roller members 3–6 to provide an upper belt run 2a and a lower belt run 2b extending throughout substantially the full length of frame 1.

As seen in FIG. 2, the portion of the upper belt run 2a extending between roller members 5 and 6 at the left end or feed-in end E of the breading machine angles downwardly from right to left.

As will be understood in the art, roller 5 may be provided with suitable conventional elements such as sprockets (not shown) spaced along the roller and which engage the endless belt 2 and when said roller is rotated the belt is movably driven such that the upper run 2a moves from left to right as viewed in FIG. 2.

Product to be breaded may be introduced to the breading machine at this feed-in end as is schemattically illustrated at P, as for example, by a suitable outlet conveyor C of a typical liquid batter machine (not shown) whereby the battered product P is placed on the upper belt run 2a, intermediate roller members 5 and 6.

The frame 1 is provided with a suitable tray 8 disposed underneath the lower belt run 2b into which bread crumbs or breading may fall and collect.

At the right end of the machine as seen in FIG. 2, an open-top bin 9 is located underneath the roller members 3 and 4 and the end of the belt 2 extending therebetween, said bin being thus positioned to catch breading or crumbs from said belt as it passes around roller member 3 and moves downwardly toward roller member 4.

As will be understood, as the lower belt run 2b moves through the tray 8 it carries a quantity of bread crumb therewith as said belt moves from right to left as seen in FIG. 2. A curved end wall 12 or shroud 12 is disposed in the tray 8 adjacent roller member 5 and functions to direct bread crumb upwardly and outwardly therefrom and whereby it forms a bed d as it is carried by the upper belt run 2a toward roller member 6. Battered product P entering into the feed-in end E of the breading machine by conveyor C is disposed onto the bed d whereupon the "fresh bread" crumb is applied to the bottom surface of said product P, thus coating the same.

As seen in FIG. 2, a gate 14 extends across tray 8 being pivotably attached at 15 to the frame 1, thus being positioned closely above the bottom belt run 2b and operable to control the quantity of bread crumb that is carried out by said belt run 2b toward the end wall or shroud 12.

As seen in FIG. 2, a flat plate 17 is supported within frame 1 directly beneath the upper belt run 2a between roller member 6 and a belt vibrator element 18, said plate 17 being positioned to support the upper belt run 2a passing therealong.

Plate 17 extends partially along frame 1 and terminates approximately at mid point thereof whereat bread crumb as indicated at "x" is free to fall onto the bottom run 2b of conveyor 2.

The vibrator element 18 is positioned underneath the upper belt run 2a and is rotatable on shaft 20 extending across frame 1. Vibrator element 18 is provided with cam surfaces or spaced knobs 21 disposed about its periphery which, as said element 18 is rotated by any suitable motor or the like (not shown), said knobs or cam surfaces strike the underside of belt run 2a and provide a slight physical vibration thereto which is effective to shake excess bread crumb therefrom so that the same falls onto the bottom belt run 2b and into tray 8 as is depicted at 23.

The breading machine of the present invention is provided with a drum-type conveyor and associated belt conveyors, now to be described which are operable to provide a top and side coating of "fresh bread" crumbs or breading to the product P.

To accomplish this, and as best seen in FIGS. 1, 2 and 6, a circular paddle wheel 25 is carried on a shaft 26 extending horizontally across the frame 1 being suitably journalled at its one end at 26a and at 26b on the opposite side of frame 1 to thereby rotatably support the paddle wheel 25 on the left side of the machine as viewed in FIG. 6. As thus supported, paddle wheel 25 is rotatable on the horizontal axis and with its shaft 26 adjacent the feed-in end E of the machine, as best seen in FIGS. 1 and 2.

Paddle wheel 25, as best seen in FIGS. 1, 2, 5 and 6 comprises a circular end wall or plate 27 journalled on the end of shaft 26 to be rotatable therewith, wherein the plane or surface 27a of wall 27 is perpendicular to the axis of shaft 26.

A plurality of rectangular shaped paddle or plate members 29 are each attached at one edge to the surface 27b of end wall 27, each said paddle member 29 projecting perpendicularly from said wall surface 27b. As best seen in FIGS. 2 and 6, said paddle members 29 are disposed on the wall surface 27b in equal axial spaced relationship to each other with respect to the shaft 26.

As seen in FIGS. 2 and 4, an elongated impervious band or wall 30 is disposed over the paddle members 29 being in resilient contact with the outward edge 31 of each paddle member 29 thus closing off the outer edge of the paddle wheel 25 to thereby form an open pocket 33 between adjacent paddle members 29.

A suitable clamp as seen at 38 in FIG. 4, attached to the abutting ends of band 30 is operable to keep the band in resilient contact with the peripheral edge of each paddle member 29 and thereby prevent breading or crumbs from passing therebetween and out of the paddle wheel 25.

As best seen in FIGS. 1, 2, 4 and 7, a plate member 39 has a flat semi-circularly shaped part 39a that is attached to the side of the frame 1 inwardly of paddle wheel 25, and is provided with an arcuate shield part 39b that is disposed perpendicularly to the plane of flat part 39a.

As best seen in FIG. 7, shield part 39b projects into the open center 40 of paddle wheel 25 so that its outer surface 39c is spaced very closely adjacent to the open ends of the pockets 33 as each of the latter moves successively therepast.

As seen in FIG. 2, plate 39 is attached to the frame 1 so that its arcuate shield part 39b has its bottom edge 42 disposed adjacent roller 5 and its top edge 43 is disposed at approximately 350° with respect to axis of wheel 25.

With the plate 39 and its arcuate shield part 39b thus disposed, and with the paddle wheel 25 being rotated in clockwise direction as viewed in FIG. 2, bread crumb disposed within the pockets 33 at positions a–f in FIG. 2 is retained therein by said shield over-lying the open ends thereof and thus prevented from falling out of said pockets.

And, as will also be understood, as the wheel 25 is further rotated in said clockwise direction as viewed in FIG. 2, bread crumb disposed in pocket 33 at position h falls out of said pocket and into a hopper unit identified in FIG. 2 at 45.

As best seen in FIGS. 1, 2, 7 and 8, hopper unit 45 comprises an open top box-like housing 46 which is positioned over the upper belt run 2a of the endless belt conveyor 2 adjacent the feed-in end E of the breading machine, extending substantially transversely across and above the entire width of said upper belt run 2a.

A pair of transfer conveyors 47a, 47b which are shown as endless belt conveyors as seen in FIGS. 1 and 8 are each disposed within the housing 46 at the open top thereof with one end extending into the open center 40 of the paddle wheel 25 and projecting substantially across the width thereof, being thus positioned so that the bread crumb falling out of pocket 33 at position h, will fall onto the upper run of each conveyor belt 47a, 47b and be transferred thereby toward and into hopper housing 46.

As seen in FIGS. 2 and 8, conveyor 47a extends approximately between one-half and three-fourths through the length of housing 46 whereby the bread crumb disposed on the upper run thereof falls into said housing at said intermediate position.

Likewise, conveyor 47b is seen to extend approximately between one-quarter and one-third through the length of hopper housing 46 whereby bread crumb from the upper run of said conveyor 47b similarly falls into housing 46 at said separate intermediate position.

As best seen in FIGS. 2 and 4, an endless belt conveyor 50 is suspended between roll members 51a, 51b directly underneath the open bottom end 52 of hopper housing 46, said conveyor 50, as seen in FIG. 2 being disposed at an angle extending downwardly to the left directly underneath and in close proximity to said open bottom end 52. Like the main conveyor 2, roller member 51a is provided with suitable drive elements such as sprockets (not shown) which drivingly engage the endless chain belt 50 for moving the same effective to advance the upper run from right to left as viewed in FIG. 2.

Conveyor 50, as will be explained in further detail hereinafter, is suitably driven so that its upper belt run moves from right to left as viewed in FIG. 2 whereby the breading falling into the housing 46 from conveyors 47a, 47b will be transferred thereby to said upper belt run of said conveyor 50 in two somewhat overlapping piles, and then transferred by said conveyor 50 to fall onto the food product P being carried therepast on the upper belt run 2a of main belt conveyor 2, positioned and moving directly therebelow to thus provide a breading or coating of the sides and top surfaces of the food product p carried on said belt conveyor 2.

As seen in FIG. 4, the belt conveyor 50 is positioned so that it deposits bread crumb onto the conveyor run 2a at position M near the feed-in end E of the machine.

As best seen in FIGS. 1, 2, and 8, a main feed hopper unit 60 is mounted on the frame 1 above the hopper housing 46, being thus positioned to introduce fresh bread crumb into said housing 46 and to replenish the bread crumb in the machine as it is used to coat the food product.

For this purpose, hopper unit 60 comprises an open-top box-like housing or bin 62 mounted on the frame 1 with its bottom open end 62a adjacent to and above the top open end of housing 46 of hopper 45.

An endless belt conveyor 64 carried on rollers 64a, 64b is disposed below the open bottom 62a of bin 62 and, as seen in FIG. 1, is positioned so that its upper belt run 64a projects at its one end over and above the open top of hopper housing 46. As seen in FIG. 2, endless belt conveyor 64 is somewhat larger in width than the open bottom 62a of bin 62 whereby all the bread crumb deposited into the latter is conveyed and deposited by said conveyor 64 into the housing 46 hopper unit 45.

As will be understood in the art roller 64a is provided with suitable sprocket elements or the like (not shown) spaced along its length and which engage the endless belt effective to advance the same as the roller 64a is rotated.

As best seen in FIGS. 1, 2, and 7, a screwtype auger identified at 70 and having stub shafts 70a at its ends is suitably mounted in bearings depicted at 71 and 72 so as to extend transversely across the frame 1; said auger being disposed within an elongated tubular housing 74 mounted in said frame, and which is open on the bottom thereof throughout its length as identified at 76.

As best seen in FIGS. 1 and 7, one end of the auger journalled in bearing 72 extends into the open center 40 of paddle wheel 25 and directly over the open end of the pockets 33.

As seen in FIGS. 1 and 2, the auger 70 overlies the bottom run 2b of conveyor 2 and with the auger being rotated clockwise as seen in FIG. 2, bread crumb deposited on said bottom run 2b is moved by the auger 70 toward the drum or paddle wheel 25.

As viewed in FIGS. 2 and 7, bread crumb that is carried by the auger 70 to the end extending into the center of the paddle wheel 25 falls into the open pockets 33 as the wheel 25 rotates.

As seen particularly in FIG. 2, bread crumb carried by the auger 70 is falling into the pockets 33 at positions p1 and p2.

The adjustable gate 14 arcuate in section, as seen in FIG. 2, is disposed adjacent the auger 70 downstream to the left and closely behind said auger with respect to the direction of movement of the bread crumb by the bottom run 2b of the conveyor 2 which is moving from right to left. Gate 80 extends across the bottom conveyor run 2b, its bottom edge being spaced above said run 2b and thus positioned to intercept the bread crumb on the conveyor run 2b and to "hill" the same and thus provide a sufficient quantity of breading to be picked up by the auger 70 for transfer to the paddle wheel 25.

As seen in FIG. 2, gate 14 is attached at its top edge to a rod 15, which in turn is journalled at its ends in the side walls of the frame 1. With this construction the gate 14 may be swung about the axis of the rod 15 being thereby adjustably positioned with respect to the surface of the conveyor run 2b and to thereby select the amount of bread crumb that is retained by said gate for "hilling" thereof at auger 70.

With the paddle wheel 25 rotating in a clockwise direction, the bread crumb deposited by said auger is carried in said pockets to the position previously referred to as position h at which point the bread crumb discharges from the pockets and falls into the hopper housing 45. In this manner, the bread crumb from the bottom run 2b of the main conveyor 2 is carried by the auger 70 and padple wheel 25 and into the housing 45 for application to the food product moving through the breading machine on the upper run 2a of said conveyor 2 with a minimum of deterioration of the bread crumb. The auger's rotational velocity and the rotation of the paddle wheel 25 may be adjusted to prevent undue and unwanted deterioration of the bread crumb. As will also be realized, the paddle wheel 25 and the components thereof defining the pockets 33 are of integral construction with no relatively moving parts therebetween, thus preventing any grinding or the like of the bread crumb as it is carried in the pockets 33, thus preventing any deterioration thereof by said paddle wheel 25.

As seen in FIG. 2, a box-like container 85 is mounted in the frame 1 directly below the bottom conveyor run 2b at position "x" at which position excess bread crumb falls from the upper conveyor run 2a. Container 85 is provided with a hingeable top 85a which may be moved to its "open" position whereby bread crumb filtering downwardly through the bottom conveyor run 2b may also fall into said container 85.

As is likewise seen in FIG. 2, the frame 1 may be provided with wheels 88 at each of its four corners so that the breading machine may be mobile and thus easily moved to any desirable position in a food processing line.

The breading machine is provided with several sources of power to drive the main conveyor belt 2, drum wheel 25, auger 70 and hopper conveyors 47a, 47b and 50.

The main drive unit for the machine is preferably a suitable hydraulic motor 90, as viewed in FIG. 2, mounted on the bottom rail 91 of the frame 1. A sprocket 92 is mounted on shaft 93 of said motor so as to be rotatable therewith. A sprocket 94 is similarly mounted on one end of roller member 5 and a double sprocket 97 is also mounted on one of the stub shafts 70a of auger 70 on the same side of the frame 1. A suitable endless link chain or the like, as depicted at 98, is threaded over sprockets 92, 94 and one of the sprockets of double sprocket 97, thereby drivingly connecting the conveyor roller 5 and auger 70 to said motor 90. Upon activation of said motor 90, the main conveyor belt 2 and auger 70 are likewise activated such that the upper run 2a of said conveyor belt moves from left to right through the frame 1 as viewed in FIG. 2, and the auger 70 is capable of moving bread crumb in an upward direction as viewed in FIG. 1 to the drum wheel 25.

An idler sprocket 101 is mounted on one end of paddle wheel shaft 26 rotatably supported in frame 1 above the auger 70. A second endless link chain 104 is threaded around the remaining sprocket of double sprocket 97 and idler sprocket 101. With this assembly, actuation of the hydraulic motor 90 rotatably drives the paddle wheel 25 about its shaft in a clockwise direction as viewed in FIG. 2.

A sprocket 109 is mounted on one end of shaft 51a of conveyor 50 and a transfer sprocket 112 mounted on shaft 113 is rotatably supported thereby within frame 1 closely adjacent to the right of idler sprocket 101 as viewed in FIG. 2 and slightly below the axis of shaft 26. The sprocket 112 is positioned so that it is engageable with the endless chain 104, just after said chain leaves sprocket 101 whereby said sprocket 112 is driven in a counterclockwise direction as viewed in FIG. 2.

An endless link chain 115 is extended over sprocket 112 and sprocket 109 which is effective to drive the endless conveyor belt 50 such that its upper run 50a moves from right to left as viewed in FIG. 2 to carry bread crumb therein and deposit the same onto the upper run 2a of the main conveyor belt 2.

As aforementioned, the endless belt conveyor 64 is operable to carry fresh bread crumb from bin 62 and deposit the same into the housing 46 of hopper unit 45.

To accomplish this, a sprocket 118 is mounted on the end of drive roller 64a of the endless conveyor 64. A suitable hydraulic motor 120 is mounted on the bin 62 adjacent drive roller 64a. A drive sprocket 122 is mounted on the shaft 122a of hydraulic motor 120, and an endless link chain 128 is extended around sprockets 118 and 122 to drivingly connect drive roller 64 to hydraulic motor 120. Actuation of said motor 120 is operable to advance the upper run 64c of the conveyor 64 from right to left as viewed in FIG. 2 to carry the fresh bread crumb from bin 62 to and into housing 46 of hopper unit 45.

As seen in FIGS. 1 and 2, the endless belt transfer conveyors 47a and 47b are each drivingly connected to a source of power such as conventional hydraulic motor of the like as depicted at 130.

To accomplish this, belt conveyors 47a and 47b are each supported at one end on a drive roller 132 which, as will be understood, is also provided with suitable sprocket elements (not shown) that engage the endless belts 47a, 47b as they pass therearound effective to drive the same. The opposite ends of said conveyor belts 47a, 47b are supported on idle rollers 135, 136 respectively.

A drive sprocket 140 is mounted on the shaft 130a of motor 130, and an idler sprocket 141 is mounted on the adjacent end of each drive roller 132. An endless link chain or the like 144 is extended around sprockets 140 and 141 to thus drivingly connect the endless conveyors 47a and 47b to the hydraulic motor 130.

With this assembly, actuation of motor 130 causes the upper run of each conveyor 47a, 47b to move in the direction of the arrow "s" as viewed in FIG. 8 to carry fresh bread crumb deposited thereon from paddle wheel pockets 33 at position h.

In operation, with hydraulic motors 90, 120 and 130 actuated to operate the main belt conveyor 2, paddle wheel 25, transfer conveyors 47a, 47b, belt conveyor 50, auger 70 and belt conveyor 64, fresh bread crumb may be deposited into the bin 62 and transferred by conveyor 64 to the hopper unit 45.

Transfer conveyors 47a, 47b then transfer the bread crumb onto conveyor 50 which then deposits said bread crumb onto the upper run 2a of the main conveyor. At the initial start-up of the breading machine, this fresh bread crumb is carried by the upper run 2a to the right as viewed in FIG. 2 until it reaches the end of plate 17 at which position "x" at least some of said bread crumb falls onto the bottom run 2b which is moving from right to left toward auger 70. Whatever bread crumb remains on the upper conveyor run 2a is carried to the end of said run whereat it falls into collector box 9 positioned therebelow.

When the bread crumb on bottom run 2b reaches the auger 70, a portion thereof, as regulated by gate 14, is moved by said auger 70 across the bottom conveyor run 2b and transferred thereby to the paddle wheel 25. This transferred bread crumb then falls into the pockets 33 at positions p1, p2 as the same passes underneath the bread crumb falling out of said auger as seen at "y" in FIG. 7.

This bread crumb is then carried by the paddle wheel 25 up to position "h" whereat it falls out of the pocket 33 and into the hopper unit 45, and onto transfer conveyors 47a, 47b.

The bread crumb on said conveyors 47a, 47b is then deposited in two somewhat overlapping piles onto the upper run of conveyor 50 and then transferred thereby over the upper run 2a of the main conveyor 2 to provide a breading coating on the top and sides of the food product passing therebelow on said upper conveyor run 2a.

The bread crumb on the bottom run 2b of said conveyor 2 which passes underneath the gate 14 is carried by said conveyor 2 and onto the upper run 2a to provide a bottom layer of bread crumb upon which the food product P is deposited at the feed-in end E of the machine.

As will be understood, by adjusting the position of gate 14, the amount of bread crumb provided for each of the bottom and top and side coatings of the food product may be selected.

As viewed in FIG. 7, a somewhat lightweight roller 155 may be rotatably supported within the side walls of the frame downstream and over the conveyor 2 from the hopper unit 45 which engages the food product P with a slight pressure and thereby presses the product into firm engagement with the bread crumb on the upper conveyor run 2a and to thereby provide for a high quality of bread crumb coating thereon.

The bread crumb may be replenished by the operator by depositing new breading into the bin 62 which is then transported by conveyor 64 into the housing 46 of hopper unit 45.

Having described a preferred embodiment of the breading machine incorporating the present invention, it will be realized that the same is susceptible to various modifications and arrangements of parts without departing from the inventive concept thereof as is defined in the claims:

I claim:

1. A breading machine for depositing fresh or green bread crumbs onto a food product comprising an elongated frame (1), an endless pervious conveyor belt (2) supported in said frame and extending therealong to define an upper conveyor run (2a) providing a product conveyance path and a lower conveyance run (2b), drive means (5, 90, 97, 98) for moving said upper conveyor along said conveyance path in a first direction and to move said lower conveyor run in the opposite direction, hopper means (45) comprising a housing (46) supported in said frame (1) above said upper conveyor run (2a), a first conveyor means (47) in said hopper means, drive means (130, 141, 144) for moving said first conveyor means, a circular conveyor (25) rotatably supported on said frame adjacent to said hopper means (45) and the bottom conveyor run (2b) of said first named conveyor belt, a plurality of pocket means (33) formed on said circular conveyor and opening to the center thereof, one end of said first conveyor means extending into the circular conveyor (25), auger means (70) rotatably supported in said frame and extending transversely thereacross above and in close proximity to the bottom conveyor run (2a) of said first named conveyor belt (2) and having one end extending into said circular conveyor (25), drive means (71, 90, 98) connected to said auger means being actuatable to rotate said auger means and remove a portion of bread crumbs from the bottom conveyor run, said auger means being rotatable to transfer said removed bread crumbs to said circular conveyor, said auger means having an opening at said circular conveyor whereby said removed bread crumbs fall into the pocket means as the same is positioned below said opening, means for rotatably driving (90, 92, 94, 115) said circular conveyor, the continued rotation of said circular conveyor positioning each said pocket means successively to a discharge position ($p^1$, $p^2$) whereat the bread crumbs therein are free to fall out thereof, said first conveyor means (47) in said hopper means having one end supported in said frame at said discharge position whereby said bread crumbs fall out of said pocket means and onto said one end of said first conveyor means, said drive means (130, 141, 144) for actuating said first conveyor means being operable to carry the bread crumbs thereon and to deposit the same into said hopper means, and said bread crumbs thereafter exiting from said hopper means and onto the food product being carried on said upper conveyor run of said first named conveyor as the same is carried therebelow.

2. A breading machine as defined in claim 1 and wherein a second hopper means (62) is disposed in said frame and positioned to deposit bread crumbs into the first named hopper means (45).

3. A breading machine as defined in claim 2 and wherein conveyor means (64) are disposed in the second hopper means (62) and means (120, 122, 118, 128) to drive said conveyor means to transfer bread crumbs from said second hopper means (62) into said first named hopper means.

4. A breading machine as defined in claim 1 and wherein the first conveyor means comprises at least one endless conveyor belt positioned (47a, 47b) to receive bread crumbs falling out of the pocket means at said discharge position.

5. A breading machine as defined in claim 4 and wherein the first conveyor means comprises a pair of endless conveyor belts (47a, 47b) each positioned to receive bread crumbs falling out of the pocket means at said discharge position ($p^1$, $p^2$), and means for driving (130, 141, 144) said pair of conveyor belts to deposit said bread crumbs thereon into said hopper means.

6. A breading machine as defined in claim 1 and wherein means (39) are provided to retain bread crumbs in certain of the pocket means (33) of the circular conveyor as said conveyor is rotated.

7. A breading machine as defined in claim 1 and wherein the pocket means (33) are in equal radial speed relation to each other about the axis (26) of said circular conveyor.

8. A breading machine as defined in claim 1 and wherein their conveyor means (50) supported in said frame between the hopper means (45) and the upper run (2a) of the first named conveyor means (2) is in position to receive the bread crumbs exiting from said hopper means, and means to actuate (101, 113, 115) said third conveyor means effective to deposit said exiting bread crumbs onto the food product passing therebelow.

9. A breading machine as defined in claim 8 and wherein the third conveyor means comprises at least one endless conveyor belt (50), and drive means for said conveyor belt for actuating (101, 113, 115) the same and to deposit the exiting bread crumbs from the hopper means onto the food product passing therebelow.

10. A breading machine as defined in either one of claims 5 and 8 and wherein the pair of endless conveyor belts (47a, 47b) are positioned in said hopper means (45) so as to deposit the bread crumbs onto the third conveyor means (50) into overlapping piles.

* * * * *